Aug. 18, 1970        J. M. SNYDER        3,524,254
CUTTING TOOL

Filed Jan. 4, 1966        2 Sheets-Sheet 1

INVENTOR.
JOHN M. SNYDER
BY Edward Halle
ATTORNEY.

Aug. 18, 1970  J. M. SNYDER  3,524,254
CUTTING TOOL

Filed Jan. 4, 1966  2 Sheets-Sheet 2

INVENTOR.
JOHN M. SNYDER

BY Edward Holle
ATTORNEY.

United States Patent Office 3,524,254
Patented Aug. 18, 1970

3,524,254
CUTTING TOOL
John M. Snyder, New York, N.Y., assignor to Commercial Carpet Corporation, New York, N.Y., a corporation of New York
Filed Jan. 4, 1966, Ser. No. 518,648
Int. Cl. B26b 3/08
U.S. Cl. 30—310
5 Claims

ABSTRACT OF THE DISCLOSURE

This invention relates to a hand cutting tool particularly adapted for cutting out of circles from flat sheet material, and in particular from a flat sheet material such as a piece of carpet or rug material while lying on the floor. The tool has a hand grip, a series of centering pin receiving means, and a cutting knife, with the centering pin means adapted to be selectively placed in the pin receiving means to vary the size of the radius of the cut.

The principal object of the invention is to provide a circle cutting tool which will cut circles out of sheets of material of identical diameter so that a circle of one sheet of material may be replaced with a circle of another sheet of material which will fit in the opening made where the circle is removed from said sheet.

Another object of the invention is to provide such a circle cutting tool which can be adjusted to cut circles, discs or rings of various sizes.

Another object of the invention is to provide such a tool which may be used to repair carpets, especially carpets comprising a multi-filament nylon pile on a sponge base, as well as other types of carpets.

A further object of the invention is to provide a tool which may be used to cut holes or openings in a carpet, such as a multi-filament nylon carpet on a sponge base or backing, and then cut from another such carpet or sheet of material a circle adapted to fit into the hole of the first mentioned carpet for the purpose of providing a contrasting design, or specific ornamentation, or other design feature in said first mentioned carpet.

Another object of the invention is to provide a cutting tool having a shape peculiarly adapted to be manipulated by the human hand and also such a tool made in units which can be easily attached and multiplied to increase the scope of the tool.

It is also an object of this invention to provide a method of repairing rugs and carpets and other similar sheet materials, and to provide methods of placing designs in rugs, carpets and other similar sheet materials.

Other objects and advantages of the present invention will become apparent in the specification hereinbelow. These objects and advantages are accomplished with the invention illustrated in the accompanying drawings in which.

Similar numerals refer to similar parts throughout the several views.

Figure 1:
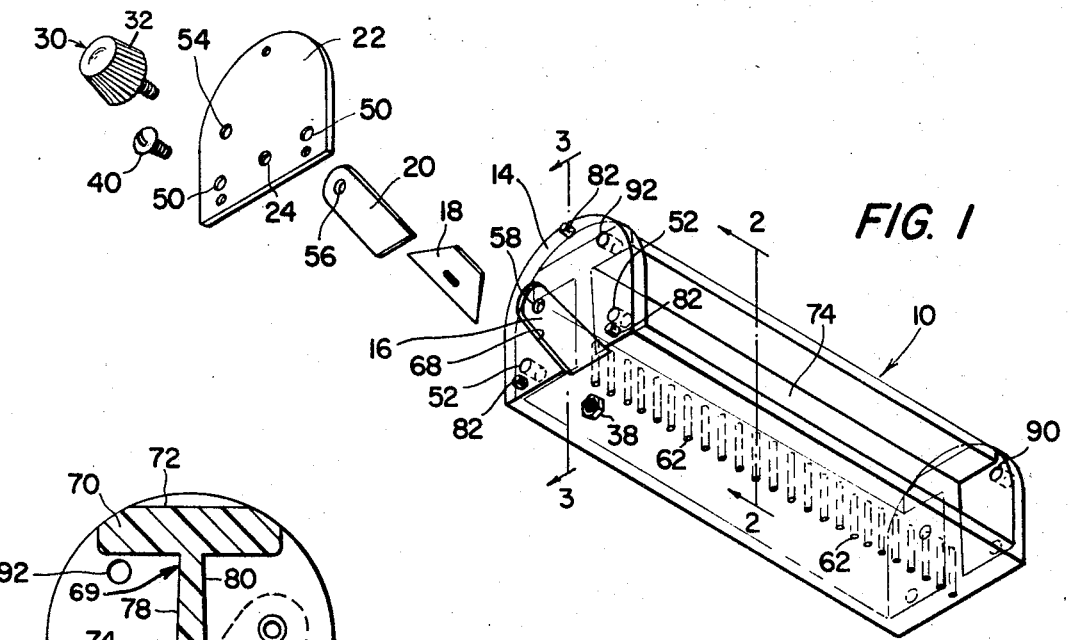
FIG. 1 is an exploded isometric showing a unit of the invention and its component parts.

The main body portion 10 of the invention may be molded of plastic or made of any other suitable material. It is comprised of a flat bottom or base portion 12 adapted to ride on the material to be cut, and a front end face 14 adapted to receive a slot or groove 16 for cutter means such as a knife blade 18 and a blade clamp 20. The device is also provided with a forward face plate 22 which may be made of plastic, but is preferably made of metal because it has a thumb screw opening 24 having internal threads 26 adapted to receive external threads 26 adapted to receive external threads 28 of thumb screw 30 which has a finger and thumb turning portion or button 32.

Figure 3:
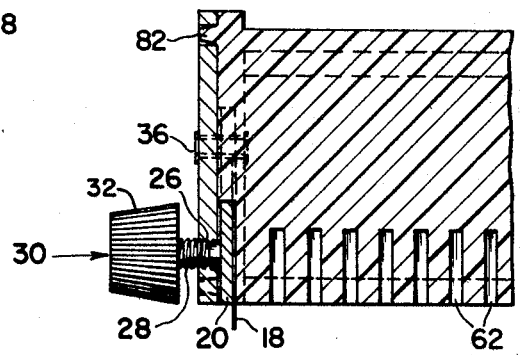
FIG. 3 is a sectional view along the lines 3—3 of FIG. 1 with the parts being non-exploded and in proper position.
Figure 4:
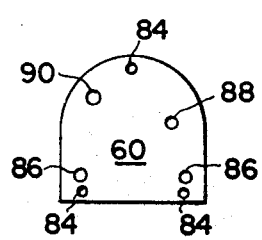
FIG. 4 is a rear elevation of the invention.

Reference to FIG. 1 and FIG. 3 of the drawings will show the positioning of the various elements of the face end of the device when installed. The knife 18 is innermost in groove 16, clamp plate 20 is then next and is adapted to hold knife 18 in position, end plate 22 comes next, being provided with thumb screw 30 which is further adapted to screw to plate 22 and protrude on the inner side against clamp 20 to maintain knife 18 positively in the desired position. Face plate 22 is fixed or fastened to face end 14 by means of a rivet 36 as well as nut 38 and bolt 40 fasteners which hold the elements together through holes 50 and 52 respectively. The rivet 36 passes through hole 54, hole 56 and hole 58 to hold the parts in which these holes are, together.

The bottom 12 of the main body portion 10 is in the shape of a rectangle with the face end 14 at one of its narrow ends and a rear end 60 at the other of its narrow ends. Between the face end and rear end, longitudinally of the rectangular shape, is a line of holes 62 spaced at regular intervals such as ¼ or ½ inch, or any other desired regular interval. These holes are perpendicular to the bottom 12, and each is adapted to hole selectively a centering pin 64. The centering pin 64 is made of such a diameter that it will fit snugly into the hole 62 without falling out and yet may be pulled out against the friction of the fit to place selectively in any of the other holes 62 of the device.

If desired, a scale (not shown) may be placed with reference marks concerning each of the holes to indicate the size of the circle which may be made by the device when any particular hole is used.

Knife blade 18 has a leading cutting edge 66. Slot 16 is positioned with its leading edge 68 at a point of juncture between face end 14 and bottom 12, where knife 18 emerges, so that said leading edge 66 of knife blade 18 will line up with the line of holes 62. Thus, when a centering pin 64 is placed in a hole 62 three inches from leading edge 66 of knife blade 18, a six inch circle will be cut by the device. The size of the circle may be varied by placing centering pin 64 in a hole 62 an equal distance from knife blade 18 to the size of the radius of the circle desired.

Figure 2:
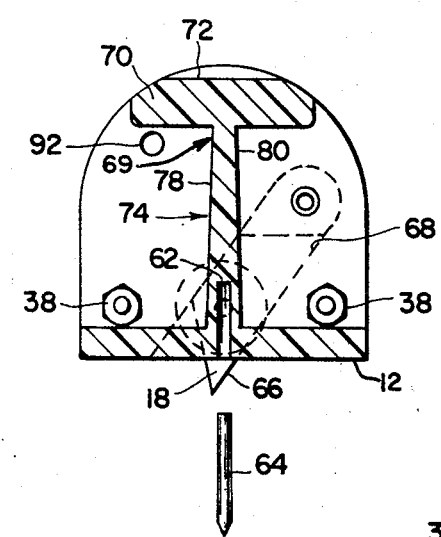
FIG. 2 is a sectional view along the lines 2—2 in FIG. 1 showing a removable centering pin exploded from the device.

A principal feature of the invention is the provision for the hand grip means 69 of the device. The hand grip means is made up of the entire upper back portion of the device, and is substantially T shaped in cross section. The top of the T 70 is adapted to have the palm of the user rest against its upper side 72. There is also a centrally located finger grip portion 74, comprising the upright of the T, which may be grasped by the thumb and fingers of the user when the palm of his hand is against top 72. This can best be understood by reference to FIG. 2 of the drawings.

Another principal feature of the invention is the provision for the main body portion 10 of the device to be made of a clear transparent plastic, or other transparent material, so that the worker may actually see what he is doing through the tool.

The tool illustrated in the drawings is designed to be used by rotating it round centering pin 64 in a clockwise direction. If the user is a right handed person, the palm of his hand will fit against element 72, his right thumb will fit against side 78 of finger grip 74, and the finger tips of his right hand will fit against side 80 of a finger grip 74. The provision of the gripping means comprising elements 70, 72, 74, 78 and 80 running substantially the length of the tool provides a positive gripping means, and gives the user the ultimate in control of a tool of this type.

If the user is left handed, he will place the palm of his hand on top element 72, a left thumb will grip or abut side 80, and the finger tips of his left hand will engage side 78. He may then make a clockwise circular motion around centering pin 64 to cut a circle out of a sheet of material. The tool may, of course, be made for counter-clockwise rotation by reversing the angle of slot 16 and placing the leading edge of the plate in 180 degree relationship.

Additional body units 10 of the device may be provided with the plate 22 and its component parts, and without the clamp 20 and knife blade 18. These further units 10 may then be attached to a base unit 10 to increase the length of the tool so that larger circles may be cut. For this purpose, lugs 82 are provided at the forward or face end of each unit 10, and complementary holes 84 are provided at each rear end of a unit 10, and in addition, other holes such as holes 86 in the rear ends will match up with holes 50, 52 in the face ends so that nuts and bolts such as 38 and 40 may be inserted to positively secure two units 10 together after the lugs 82 are fitted into the holes 84.

Figure 5:
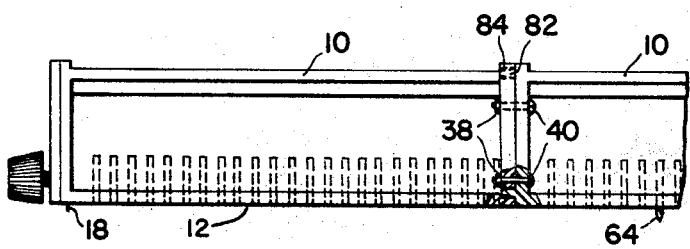
FIG. 5 is a side elevational view showing two basic units of the invention connected together to form an extended tool.
Figure 6:
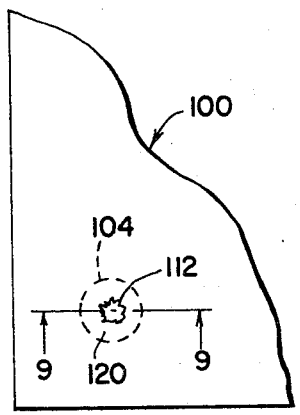
FIG. 6 is a representation in top plan of a piece of laid carpet with portions cut away showing a burnt portion, having been burnt by a cigarette, with a circle dotted around the burnt portion.
Figure 7:
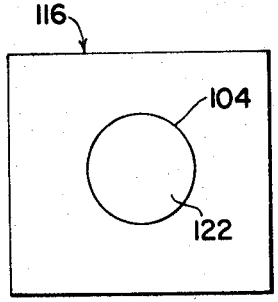
FIG. 7 is a top plan view of another portion of carpet with a circle cut having been made therein before the circular cut portion has been removed.
Figure 8:
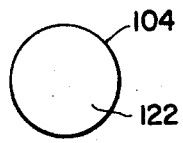
FIG. 8 is a top plan view of a new portion of carpet, such as a circular piece cut from FIG. 7, which will be used to replace a damaged portion of the carpet such as is shown in FIG. 6.
Figure 9:
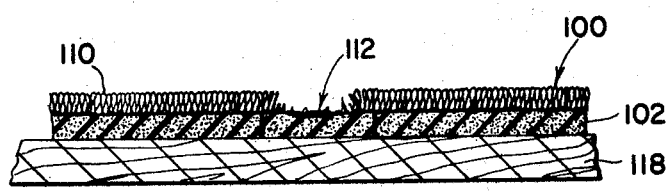
FIG. 9 is a sectional view along the lines 9—9 in FIG. 6 showing the carpet with the circular cut made around the burnt portion.
Figure 10:
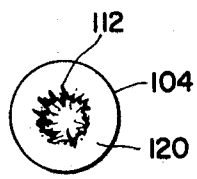
FIG. 10 is a top plan view of the burnt portion of the carpet of FIGS. 6 and 9 after it has been cut out by the tool of the invention.
Figure 11:
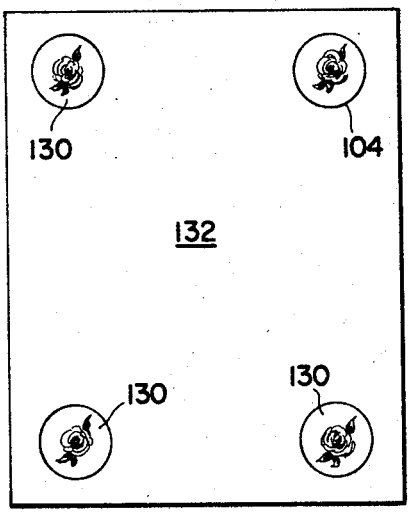
FIG. 11 shows a top plan representation of a plain colored carpet having four circular cutout inserts containing rose designs cut with the tool of the invention and inserted by the method of the invention.

I may also provide hole 88 in the rear plate which will be complementary to hole 58 in the front plate so that a nut and bolt 38 and 40 may be used through such holes and another hole 90 in the rear face complementary to a hole 92 in the front face for further fastening by nut 38 and bolt 40. The net result is illustrated in FIG. 5 of the drawings which show two units 10 fastened together to elongate the tool. Thus, if each unit is made in a reasonably convenient size such as a 6 or 7 inch length, which would be normally adequate to fit the hands of most, if not all, of the users of the tool, the incorporation of two units 10 would increase the usable length of the tool to approximately 12 inches, and of course, the incorporation of each further unit would increase the length of the tool by another 6 or 7 inches.

The method of carpet repair incorporated in this invention works as follows. When a pile carpet 100 having a sponge backing or base 102 and a multi-filament nylon pile portion 110 has been damaged by a cigarette burn 112 or other destructive medium, it may be repaired. The damaged section of carpet may be cut out and a new section put in which may be adhesively secured at the sponge backing or base. The first step is to estimate the size of a circle of carpet to be removed which will cover the greatest area of damage. In the case of an ordinary cigarette burn, a circle of approximately 4 inches in diameter would be sufficient. The next step is to select a piece of identical carpet 116 to that damaged from which a circle of at least 4 inches in diameter may be cut. The next step is to adjust the tool to cut a 4 inch circle by placing the centering pin 64 in a hole 62 approximately 2 inches from the knife blade 18. The tool is then grasped in the hand of the user, the centering pin is placed at the center of the damaged portion of the rug or carpet and a circle 104 is cut by twisting the tool in a clockwise direction. As a part of this process, the knife edge must be adjusted so that it will come out far enough from bottom 12 to cut through the sponge backing 102 of the carpet, and yet not too far so that it will cut through or into the floor 118 on which the carpet is lying. The circle is then cut around the damaged portion of the carpet and the circular damaged portion of carpet 120 is removed. A corresponding circle is cut from the new piece of carpet 122 selected without making any further adjustment to the tool. Thus, a new circle of carpet of the exact size of the damaged circular portion will be obtained.

Adhesives well known to the art are then applied to the sponge backing material forming the hole in the carpet lying on the floor and also to the circumference of the sponge backing material of the new circular section, and if desired, to the floor and to the back of the new circular section. The new circular section is then placed in its proper position in the hole of the old carpet and the adhesive is permitted to set thereby effecting a repair by the method of the invention.

The identical method of the invention may be used to supply a decorative portion 130, such as a rose design, to an otherwise plain carpet 132 by cutting out circles in the plain carpet and replacing them with circles 130 from a carpet having a design, such as the rose, or contrasting color, or both, or any other design. In addition, letters of the alphabet to form initials, or a message or legend of some kind can be placed into carpets by the method of the invention. As a matter of fact, any contrasting arrangement may be designed into an existing carpet installation by the method of the invention.

It is submitted that the tool and the method for its use, although primarily designed for use in the carpet trade, may be used in any other application to which it is adaptable, and it is to be understood that the use of the term "carpet" may be applied to any type sheet material adapted to have circles or rings removed therefrom by a circle cutting tool, and it is further to be understood that the tool of the invention may be used in connection with any such sheet material.

While I have described my invention in its preferred form, there are other forms which it may take without departing from the spirit and scope of the invention, and I, therefore, desire to be protected for all forms coming within the scope of the claims hereinbelow.

Wherefore I claim:

1. A circle cutting tool having a main body portion including front and rear ends and comprising: a bottom including a plurality of regularly spaced openings adapted to receive removable friction slide fitting centering pin means selectively in a desired opening, said plurality of openings bearing an aligned relationship and being positioned between said front and rear ends, said front end adapted to receive cutter means, with cutter holding means associated with said front end, said cutter means having a cutter edge being adjustably held by said cutter holding means in substantial alignment with said plurality of holes, and hand grip means being substantially as long as the said body portion and comprising a substantially T-shaped cross section in which the top of the T is adapted to be contacted by the palm of the user, and the upright of the T is adapted to be contacted by at least one finger of the user.

2. The circle cutting tool as defined in claim 1, in which the main body portion is transparent.

3. The circle cutting tool as defined in claim 1, in which the front end of the main body portion is provided with a plurality of lugs and the rear end of the main body portion is provided with a plurality of holes, in substantially the same spacial position with the said rear end as said lugs have to said front end, said front and rear ends being in spaced substantially parallel relationship in front of and to the rear of said substantially T-shaped handle.

4. The circle cutting tool as defined in claim 3, which comprises at least two connectable units in which the first of said units is substantially as described in claim 3, and the second of said units is substantially the same as described in claim 3 with the exception that it does not include the cutter holding means so that the front end of said second mentioned unit may be abutted to the rear end of the said first mentioned unit with the lugs of the front end of the second mentioned unit friction fitted within the holes of the rear end of the first mentioned unit.

5. The circle cutting tool as defined in claim 4, which also includes at least one fastening means other than the said lugs and holes to secure the said units together.

References Cited
UNITED STATES PATENTS

| | | | |
|---|---|---|---|
| 535,217 | 3/1895 | Melvin | 156—265 |
| 1,113,030 | 10/1914 | McLaurin | 156—98 X |
| 1,620,884 | 3/1927 | Gallopin | 156—98 X |
| 1,765,098 | 6/1930 | Roozendaal | 2—243 |
| 1,935,480 | 11/1933 | Mencken | 156—265 X |
| 2,012,929 | 8/1935 | Knowland | 161—67 X |
| 2,055,464 | 9/1936 | Bowes | 161—67 X |
| 2,468,504 | 4/1949 | Little | 30—310 |
| 3,271,217 | 9/1966 | Mapson | 156—98 |
| 2,986,814 | 6/1961 | Brinkman | 30—300 |
| 3,027,640 | 4/1962 | Zimmerman | 30—310 |
| 3,057,065 | 10/1962 | Zimmerman | 30—310 |

JOHN T. GOOLKASIAN, Primary Examiner

W. E. HOAG, Assistant Examiner

U.S. Cl. X.R.

156—98